United States Patent [19]

Corwin et al.

[11] 4,412,025

[45] Oct. 25, 1983

[54] ANTI-BLOCK COMPOUNDS FOR EXTRUSION OF TRANSITION METAL CATALYZED RESINS

[75] Inventors: Michael A. Corwin, Millington; George N. Foster, Bloomsbury, both of N.J.

[73] Assignee: Union Carbide Corporation, Danbury, Conn.

[21] Appl. No.: 309,658

[22] Filed: Oct. 8, 1981

Related U.S. Application Data

[63] Continuation-in-part of Ser. No. 242,457, Mar. 11, 1981, abandoned.

[51] Int. Cl.³ .................... C08J 5/18; C08K 3/00; C08K 3/36; C08K 5/13
[52] U.S. Cl. .................... 524/241; 524/243; 524/244; 524/324; 524/326; 524/100; 524/323; 524/333; 524/342; 524/345; 524/348; 524/350; 524/351; 524/353; 524/417; 524/427; 524/442; 524/443; 524/448; 524/451; 524/492; 524/585; 525/187; 264/176 R; 264/211
[58] Field of Search ............... 524/492, 427, 443, 448, 524/451, 323, 345, 342, 353, 351, 350, 442, 241, 244, 243

[56] References Cited

U.S. PATENT DOCUMENTS

| | | | |
|---|---|---|---|
| 2,956,035 | 10/1960 | Mock | 260/23 |
| 3,425,981 | 2/1969 | Puletti et al. | 260/41 |
| 4,013,622 | 3/1977 | DeJuneas et al. | 260/45.95 |

FOREIGN PATENT DOCUMENTS

| | | |
|---|---|---|
| 961998 | 1/1975 | Canada . |
| 1156627 | 7/1969 | United Kingdom . |
| 2075030 | 11/1981 | United Kingdom . |

*Primary Examiner*—Carman J. Seccuro
*Attorney, Agent, or Firm*—Clement J. Vicari

[57] ABSTRACT

A non-volatile, anti-gel compound having a chain of at least about 5 repeat units of an alkylene oxide and which is soluble in olefin polymers, and an inorganic anti-block agent having a substantially neutral pH are added to a film grade transition metal catalyzed resin containing halide residues such as Ziegler-Natta catalyzed olefin polymer compositions to prevent: (1) gel streaking/pinstriping during film extrusion processes; (2) blocking of the extruded film; and (3) discoloration of the extruded film upon aging. The anti-gel compound has a molecular weight between about 200 and about 4,000,000 Daltons.

62 Claims, No Drawings

ANTI-BLOCK COMPOUNDS FOR EXTRUSION OF TRANSITION METAL CATALYZED RESINS

This application is a continuation-in-part of application Ser. No. 242,457, filed Mar. 11, 1981 and now abandoned.

BACKGROUND OF THE INVENTION

1. Field of the Invention

This invention relates to anti-gel and anti-block components useful for reducing optical degradation phenomena and discoloration in extruded film.

2. Description of the Prior Art

Olefin polymers such as polyethylene have been used for a number of years for the preparation of films by extrusion processes. Unlike high pressure, free radical polymerized polyethylenes, low pressure, low density polyethylenes prepared in the presence of transition metal catalysts such as the Ziegler-Natta catalysts frequently develop gel-like defects when extruded, e.g., when extruded as blown films. In a blown film process, polyethylene pellets or granules are melted and extruded from an annular die to form a film envelope. In the extruder and die system, there are typically "dead spots" or "hangup areas" where molten polyethylene does not move rapidly, resulting in long heat histories for portions of the melt. As portions of the polymer are flushed from these hangup areas, they cause optical degradation phenomena in the film, known as "pinstriping" and "gel streaking".

By "pinstriping" is meant haze bands resulting from accumulations of micro-gels which are aligned in the machine direction during the film forming process. By "gel-streaking" is meant surface roughness in the form of the inclusion, either singularly or in rows, of "v-shaped" gels ("arrowheads" or "chevrons"), streaks of soft gels, or, in extreme cases, film texture completely permeated by soft gels. Such optical degradation phenomena not only detract from film optical and mechanical strength properties, but also can cause severe problems with respect to maintaining bubble geometry during the film forming process.

Because of the fact that the extrusion processes usually involve the use of relatively high extrusion temperatures and prolonged extrusion times, in commercial practice, various anti-oxidants, such as hindered phenolics, are admixed with the olefin polymer, to prevent undesirable degradation of the polymer during the preparation of the film. When such anti-oxidants are used, however, with the film forming grades of olefin polymers in certain types of extrusion equipment, the anti-oxidants appear to pronounce, if not create, gel-streaking and pinstriping in the products thus formed.

Blocking of olefin polymer films is a well known phenomenon. By blocking is meant the tendency of films or sheets to stick or adhere to each other or to other surfaces whenever adhesion is undesirable. Various anti-block agents are commonly incorporated into film forming polymers or applied to film surfaces to reduce blocking. For example, stearamide, stearoguanamine, metal salts of fatty acids such as calcium stearate; sodium dioctylsufosuccinate; finely divided silica or calcium carbonate; alkylamines and alkyl quaternary ammonium compounds are anti-block agents which have been incorporated into the film forming polymer before extrusion.

Many solutions have been proposed to eliminate gel-streaking and pinstriping. For example, it is known to physically remove the chloride catalyst residue, prior to extrusion, by leaching the reaction product of polymer and chloride catalyst residue with alcohols, aqueous acid, water, or treating the polymer and catalyst with propylene oxide followed by an alcohol or water wash and the like. Such treatments usually produce white polymers initially, but a yellow or tan color returns when the polymers are subjected to molding and/or heating operations. In order to avoid this undesirable color formation, it is usually necessary to use a second or even a third clean-up procedure requiring the use of large quantities of deactivating materials. Another practice in the art involves drying the after-treated polymer prior to fabrication. Because they usually must be repeated several times in order to obtain a polymer having acceptable color upon exposure to heat, such cleanup procedures are both expensive and time consuming. Illustrative of such prior art treatments are those disclosed in U.S. Pat. Nos. 3,925,341; 3,962,199; 3,247,351; 4,029,877; 4,117,219; 3,299,027; 3,923,760; 3,308,105; and 4,098,990.

Other treatments disclosed in the prior art involve the addition of compounds to the polymer prior to fabrication in order to complex with the harmful components in the chloride catalyst residue and deactivate them. Illustrative of these prior art treatments are those disclosed in Canadian Pat. No. 961,998, U.S. Pat. No. 4,013,622 and in U.S. Pat. No. 3,773,743.

U.S. Pat. No. 3,773,743 discloses a method for improving the stability and color of olefin polymers by deactivating their Ziegler-Natta chloride catalyst residues. This method involves high temperature (190° C.–250° C.) processing with hydroxyl compounds ($H_2O$ and primary alcohols) and with an organic base such as an alkyl amine; aryl amine; Li, Ca and Zn salts of carboxylic acids; trialkyl phosphites; and metal alkoxides. The concentration disclosed for the hydroxy source is the range of 0.5 to 1.5 weight percent and a concentration of 50 to 2500 parts per million (ppm) is disclosed for the organic base. At the processing temperatures disclosed, some of the organic bases and the hydroxy sources would be volatile and cause foaming of the product if the processing were not done in a way to remove volatiles, e.g., as in devolatilizing extruders.

Canadian Pat. No. 961,998 and U.S. Pat. No. 4,013,622 disclose the addition of polyalkylene glycol having a molecular weight between 100 and 20,000 to film grade olefin polymers to prevent gel streaking during film extrusion processes. In the practice as taught in the Examples—Superfloss with a pH of about 9 to 11 is used as the anti block—the extruded film made according to Canadian Pat. No. 961,998 discolors in a few weeks even at ambient temperatures, i.e., it turns a yellowish color which is, of course, undesirable.

The potential cause for discoloration on ageing in extruded films or molded articles is generally recognized as related to the presence of hindered phenolic anti-oxidants. Discoloration generally is believed to result from the reaction or breakdown products of such anti-oxidants. Exposure of these anti-oxidant stabilized compositions to air pollution in the form of oxides of nitrogen can promote discoloration. Thermal abuse in processing, especially in the presence of prodegradants, can lead to the build-up of chromophoric quinoid structures from break-down of the hindered phenolic anti-oxidants.

Prodegradants can be additives used to control surface slip or release properties, anti-static properties, and gel streaking tendencies. For example, prodegradants act to provide hydroperoxides to accelerate auto-oxidation. Polyethylene glycols used to control gel streaking and unsaturated fatty amides used for slip control can act with thermal abuse as prodegradants. Trace metals from inorganic anti-blocks or fillers can act as reduction-oxidation catalysts to accelerate hydroperoxide decomposition, especially at low temperatures where the peroxide decomposition is the rate limiting step. At such low temperatures, normally volatile, anti-oxidant reaction or break-down products can accumulate, promoting discoloration. Moreover, inorganic additives or fillers such as finely divided silica with iron contamination can interact with the hindered phenolic anti-oxidant to form chromophoric, phenolate species.

SUMMARY OF THE INVENTION

1. Objects of the Invention

An object of the present invention is to provide an extrudable, film forming composition comprising a transition metal catalyzed resin such as a Ziegler-Natta catalyzed olefin polymer and an extruded film made from such extrudable composition, which film is free from gel streaking and pinstriping.

Another object of the present invention is to provide a process wherein a film forming composition containing a transition metal catalyzed olefin polymer containing halide residues may be extruded without optical degradation phenomenon appearing within the extruded film or film discoloration occurring subsequently.

Another object of the present invention is to provide an anti-gel and an inorganic anti-block compound which when added to a Ziegler-Natta catalyzed olefin polymer, is useful in removing or reacting with the chloride catalyst residue in the olefin polymer to prevent gel streaking or pinstriping from occurring in a subsequent extrusion process, as well as preventing discoloration from occuring upon aging of the extruded film.

An object of the present invention is to provide an improved process for extruding tubular olefin polymer film.

An object of the present invention is to provide a masterbatch concentrate which can be admixed with a transition metal catalyzed olefin polymer containing halide residues to provide the extrudable film forming composition of this invention.

2. Brief Summary of the Invention

This invention is based on the discovery that an optical degradation phenomenon, known as gel streaking and pinstriping, present in extruded transition metal catalyzed olefin polymer containing halide residue, can be substantially prevented through the addition of small amounts of an anti-gel compound of low volatility. In addition, when extrusion is also carried out in the presence of an inorganic anti-block compound having a substantially neutral pH, i.e., between about 6 and about 8, film sticking or tackiness is prevented without leading to discoloration of the film upon aging. The anti-gel compound is characterized by having a chain of at least about 5 repeat units of an alkylene oxide and by having a molecular weight between 200 and 4,000,000 Daltons. According to the present invention, the incidence of gel streaking or pinstriping in the film during the extrusion of a transition metal catalyzed olefin polymer containing halide residues and discoloration of the extruded film upon aging are both minimized through the use of a composition comprising:

a majority of a transition metal catalyzed olefin polymer containing halide residues; and a minor amount of at least one hindered phenolic anti-oxidant, an inorganic anti-block compound and an anti-gel compound as defined herein.

This invention also relates to an improved method of extruding a Ziegler-Natta catalyzed olefin polymer which comprises extruding a film forming composition containing a Ziegler-Natta catalyzed olefin polymer and minor amounts of at least one hindered phenolic anti-oxidant, an inorganic anti-block compound and an anti-gel compound as defined herein.

Moreover, this invention relates to a masterbatch concentrate which may be admixed with a transition metal catalyzed olefin polymer containing halide residues to yield the film forming composition of this invention.

3. Description of the Preferred Embodiments

In one aspect, the present invention relates to an extrudable film forming composition which, when extruded, forms film essentially devoid of gel streaking and pinstriping and which does not discolor upon aging at 60° C. for 4 weeks. The film forming composition is comprised of at least one olefin polymer containing a halide catalyst residue, at least one hindered phenolic anti-oxidant, an inorganic anti-block compound having a substantially neutral pH, and an anti-gel compound characterized by having at least about 5 repeat units of an alkylene oxide. The anti-gel compound is present in a concentration sufficient to neutralize the halide catalyst residue in the composition. The concentration of anti-gel compound is at least about 0.8 times the concentration of the anti-oxidant.

The residues of transition metal catalysts such as the Ziegler-Natta catalysts usually include trace amounts of magnesium, titanium, aluminum and chlorine. By chloride residues, as used herein, is meant the chlorides of magnesium, titanium and aluminum present in a Ziegler-Natta catalyst residue. Chloride catalyst residue concentrations between about 5 and about 200 ppm are typical for ethylene polymers and chloride catalyst residue concentrations between about 10 and about 500 ppm are typical for propylene polymers and butene polymers made with Ziegler-Natta catalysts.

Anti-oxidants in a concentration of 20 to 500 ppm are typically added to ethylene polymer compositions. According to the present invention, the anti-gel compound is present in a concentration of 25 to 10,000 ppm for polyethylene resin compositions. Concentrations of 200 to 5000 ppm of anti-oxidant are typically added to propylene polymer or butene polymer compositions and concentrations of anti-gel compound of 200 to 10,000 are added to propylene polymer or butene polymer composition.

Inorganic anti-block compounds in a concentration of 500 ppm to 5% by weight are typically added to olefin polymer compositions.

In another aspect, the present invention relates to a process for extruding a film forming olefin polymer based composition into film. The film is essentially free from gel streaking and pinstriping and does not discolor upon aging at 60° C. for 4 weeks. Prior art polymer based compositions comprised a Zeigler-Natta catalyzed film grade olefin polymer which contained at least one anti-oxidant having a concentration between about 20 and about 5000 ppm, and an inorganic anti-block compound having a concentration between about 500 ppm and about 5% by weight. The prior art inorganic anti-block typically had a pH above about 8. The aforementioned prior art polymer based compositions were susceptible to gel streaking and pinstriping during formation of the film. It also has been discovered that when inorganic anti-block compounds having a pH below 6 or above 8 were present in the aforementioned prior art compositions, film that was formed discolored after aging a few weeks at 60° C. or months at ambient temperature.

In still another aspect, the present invention relates to a masterbatch concentrate which, when admixed with a transition metal catalyzed olefin polymer containing halide residues in proportions defined herein, provides a film forming composition capable of being extruded into a film which is essentially free from gel streaking and pinstriping and which does not discolor upon aging at 60° C. for 4 weeks.

This invention is based upon the discovery that such prior art compositions and prior art extrusion processes may be improved by extruding a transition metal catalyzed olefin polymer based composition containing halide residues into film in the presence of a hindered phenolic anti-oxidant, an anti-block compound having a substantially neutral pH, and an anti-gel compound characterized by containing at least about 5 repeat units of an alkylene oxide. Preferably, the anti-gel compound is characterized by having more than about 10 repeat units of an alkylene oxide. The anti-gel compound typically is present in a concentration between about 25 and 10,000 ppm, based upon the weight of the polymer and has a molecular weight between about 200 and 4,000,000 Daltons.

The hindered phenolic anti-oxidant, inorganic anti-block compound and anti-gel compound are uniformly dispersed in the olefin polymer based extrudable composition. The dispersion can be effected by various dispersion techniques commonly employed by those skilled in the art of preparing extrudable composition. The three aforementioned additives could be directly introduced into the olefin polymer (e.g., polyethylene) via a V-type blender or by mixing via a Henschel type intensive mixer. The three aforementioned additives also could be directly hot compounded into the olefin polymer or made into a masterbatch for final letdown using conventional hot processing equipment such as a Banbury mixer, a Werner Pfleiderer twin screw mixing extruder or a single screw mixer extruder that has pelletization equipment on the head of the extruder.

THE ANTI-GEL COMPOUND

The anti-gel compound of this invention may be represented by the following structural formula:

R—(A—R$_1$)$_n$, wherein

R is a hydrogen atom; a hydroxyl group; a C$_1$–C$_{24}$ alkoxy group; a C$_1$–C$_{12}$ alkylated phenoxy group; a C$_{12}$–C$_{24}$ alkyl or alkylene substituted amino or amide group;

n is 1 or 2;

R$_1$ is a hydrogen atom or lower alkyl;

A is (R$_2$O)$_x$ or

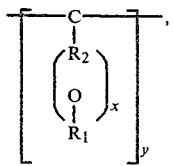

wherein

R$_2$ is ethylene, propylene or mixtures thereof;

x is a number between about 5 and less than about 20,000; and y is a number between about 2 and about 6; and R$_1$ is as defined hereinabove.

These anti-gel compounds are of low volatility and have a molecular weight in the range of about 200 to about 4,000,000 Daltons, preferably in the range of about 800 to about 200,000 Daltons. Below a molecular weight of about 200 Daltons, volatility is high and causes smoking and equipment plate-out problems. Above a molecular weight of about 4,000,000 Daltons and depending upon the molecular weight of the polymer, poor dispersion of the anti-gel compound may occur causing gel-like defects to result in the film.

Suitable anti-gel compounds according to the present invention include:

low molecular weight oligomers up to high molecular weight polymers such as polyethylene and polypropylene glycols and interpolymers thereof having a molecular weight greater than about 200 and less than about 20,000 Daltons, and polyethylene and polypropylene oxides and interpolymers thereof having a molecular weight greater than about 20,000 and less than about 4,000,000 Daltons;

the reaction product of an alkanol with more than about 5 moles of an alkylene oxide such as ethylene or propylene oxide adducts of lauryl alcohol, mystearyl alcohol, palmityl alcohol, stearyl alcohol, arachidyl alcohol, behenyl alcohol, oleyl alcohol and erucyl alcohol, and mixtures thereof; and the reaction product of an alkyl phenol such as methyl, ethyl, propyl, butyl, pentyl, hexyl, heptyl, octyl, nonyl, decyl, undecyl, or dodecyl phenol with more than about 5 moles of an alkylene oxide such as ethylene or propylene oxide, and mixtures thereof.

Other anti-gel compounds considered suitable according to the present invention include:

the reaction product of a C$_{12}$–C$_{24}$ alkyl amine or amide such as lauryl, mistearyl, palmytyl, stearyl, arachidyl, and behenyl amine or amide, respectively, with more than about 5 moles of an alkylene oxide such as ethylene or propylene oxide, and mixtures thereof;

the reaction product of a C$_{12}$–C$_{24}$ alkylene amine or amide such as oleyl and erucyl amine or amide with more than about 5 moles of an alkylene oxide such as ethylene or propylene oxide, and mixtures thereof; and the reaction product of polyols such as glycerol, mannitol, or sorbitol and their partial esters, in particular the partial fatty acid esters such as glycerol monostearate; sorbitol mono- and di-laurate, with more than about 5 moles of an alkylene oxide such as ethylene oxide or propylene oxide, and mixtures thereof.

OLEFIN POLYMERS

The extrudable olefin polymers employed in the extrudable compositions of the present invention are normally solid materials, that is, solid at room temperature. Any transition metal catalyzed extrusion grade olefin polymer containing halide residues can be used in the compositions of the present invention. The term "olefin polymer" thus includes homopolymers of the olefins, as well as interpolymers of one or more olefins with each other, and/or up to about 30 weight percent of one or more monomers which are copolymerizable with such olefins. The olefins such as ethylene, propylene, butene-1, isobutylene, pentene-1, 4-methyl-pentene-1, hexene-1, octene-1, nonene-1, decene-1, as well as interpolymers of one or more of such olefins and one or more other monomers which are interpolymerizable with such olefins, such as other vinyl and diene compounds, i.e., those having the group

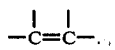

Preferred copolymers are the ethylene copolymers such as ethylene/propylene copolymers, ethylene/butene-1 copolymers, ethylene/pentene-1 copolymers, ethylene/4-methyl-pentene-1 copolymers, ethylene/hexene-1 copolymers, ethylene/octene-1 copolymers, and the like. Preferred ethylene interpolymers would include two or more of the following: propylene, butene-1, pentene-1, hexene-1, 4-methyl-pentene-1 and octene-1. Preferred propylene interpolymers would include ethylene, butene-1, pentene-1, hexene-1, 4-methyl-pentene-1 and octene-1 as monomers. Preferred butene-1 interpolymers would include ethylene, propylene, hexene-1, 4-methyl-pentene-1 and octene-1 as monomers.

Also included in the term polymer are blends of one polymer with one or more other polymers. Illustrative of such blends are ethylene polymers with one or more of the following: polypropylene, polybutene-1, and polar monomer containing olefin copolymers such as ethylene/acrylic acid copolymers, ethylene/methyl acrylate copolymer, ethylene/ethylacrylate copolymer, ethylene/vinyl acetate copolymer, ethylene/acrylic acid/ethyl acrylate terpolymer, ethylene/acrylic acid/vinyl acetate terpolymer, and the like.

Also included within the term polar monomer containing olefin copolymers are the metallic salts of those olefin copolymers, or blends thereof, which contain free carboxylic acid groups. Illustrative of such polymers are ethylene/acrylic acid copolymer, ethylene/methacrylic acid copolymer, propylene/acrylic acid copolymer, butene/acrylic acid copolymer, an oxidized olefin polymer, and the like.

Illustrative of the metals which can be used to provide the salts of said carboxylic acid polymers are the one, two and three valence metals, such as sodium, lithium, potassium, calcium, magnesium, aluminum, barium, zinc, zirconium, beryllium, iron, nickel, cobalt, and the like.

The preferred olefin polymers for use in the present invention are polymers of ethylene, and the most preferred polymers are those having a melt index of about 0.1 to 10 grams per 10 minutes, a density of about 0.910 to 0.955 gm/cc. Low density ethylene polymer has a density of between approximately 0.910 and 0.925 gm/cc, medium density ethylene polymer has a density of between approximately 0.925 and 0.940 gm/cc, and high density ethylene polymer has a density of between approximately 0.940 and 0.970 gm/cc. Thus, the low density ethylene polymers are the most preferred olefin polymers to be used in the present invention, although the medium and high density polymers also may be used.

Preferred low pressure, low density ethylene copolymers for use in the present invention include those which may be produced in accordance with the procedures set forth in U.S. patent application Ser. No. 892,325, filed Mar. 31, 1975, and refiled as Ser. No. 014,414 on Feb. 27, 1979, in the names of F. J. Karol et al. and entitled "Preparation of Ethylene Copolymers in Fluid Bed Reactor", and the procedures set forth in U.S. patent application Ser. No. 892,322, filed Mar. 31, 1978, and refiled as Ser. No. 012,720 on Feb. 16, 1979, in the names of G. L. Goeke et al. and entitled "Impregnated Polymerization Catalyst, Process for Preparing, and Use for Ethylene Copolymerization" as well as procedures which will produce ethylene hydrocarbon copolymers with properties as heretofore described. U.S. application Ser. No. 014,414 corresponds to European Patent Application No. 79100953.3 which was opened to the public on Oct. 17, 1979 as Publication No. 4645 and U.S. application Ser. No. 012,720 corresponds to European Patent Application No. 79100958.2 which was opened to the public on Oct. 17, 1979 as Publication No. 4647. The disclosures of Publications Nos. 4645 and 4647 are incorporated herein by reference.

Other low pressure, low density ethylene hydrocarbon polymers preferred for use in the present invention are those which may be prepared as described in U.S. Pat. No. 4,011,382, entitled "Preparation of Low and Medium Density Ethylene Polymer in Fluid Bed Reactor" by I. J. Levine et al., the disclosure of which is incorporated herein by reference.

The olefin polymers may be used in the form of powders, pellets, granules, or any other form that can be fed to an extruder.

THE ANTI-OXIDANTS

As noted above, the extrudable compositions of the present invention contain at least one anti-oxidant for the olefin polymer. These anti-oxidants are present in stabilizingly effective quantities. Such amounts are about 0.002 to 0.5, and preferably about 0.01 to 0.05, percent by weight, based on the weight of the olefin polymer. The anti-oxidant stabilizers which may be employed in the compositions of the present invention include all those polyolefin anti-oxidants commonly employed in olefin polymer based film extrusion compositions. These materials are such as are capable of providing anti-oxidant protection at processing temperatures of the order of about 135° C. to about 340° C. or higher.

Such anti-oxidant stabilizers include primary hindered phenolic stabilizers, such as p-hydroxyphenylcyclohexane; di-p-hydroxphenylcyclohexane dicresylolpropane; tertiary butyl para cresol; 2,6-di-tert-butyl-p-cresol; 2,4,6-tri-tert-butylphenol; octadecyl-3-(3',5'-di-tert-butyl-4'-hydroxyphenol)propionate; tetra kis[methylene 3-(3',5'-tert-butyl-4'-hydroxyphenyl)propionate]methane; 1,3,5-trimethyl-2,4,6-tris(3,5-di-tert-butyl-4-hydroxybenzyl)benzene; tris(3,5-di-tert-butyl-4-hydroxybenzyl)isocyanate; 1,3,5-tris(4-tert-butyl-3-hydroxy-2,6 dimethyl benzyl)-1,3,5-triazine-2,4,6-(1H,3H,5H)-trione; and bis-[3,3-bis-4'-hydroxy-3'-tert-butyl-phenyl)-butanoic acid]-glycol ester; condensation products of dialkylphenols with formaldehyde; reaction products of phenol with styrene, 1,1'-methylene-bis(4- hydroxy-3,5-tert-butyl-phenol), 2,2'-methylene-bis-(4-methyl-6-tert-butylphenol), 2,6-(2-tert-butyl-4-methyl-6-methylphenol)-p-cresol, phenylethylpyrocatechol, phenolisoproplpyrocatechol, 1,1,3-tris(2'-methyl-3'-t-butyl-4-hydroxy phenol) butane, 2,2-methylene-bis[6-(O)-methylcyclohexyl)-4-methylphenol], 1,3,5-trimethyl-2,4,6-tris-(3',5'-di-t-butyl-4-hydroxybenzyl)benzene and 2-napthol; and sulfur containing compounds such as 2,2'-thio-bis-(4-methyl-6-tert-butylphenol), 4,4-thio-bis(3-methyl-6-tert-butylphenyl). Secondary anti-oxidant stabilizers which may also be used in conjunction with the primary hindered phenolic antioxidants in the extrudable compositions include distearyl thiodipropionate and dilauryl thiodipropionate; and phosphite compounds such as trimixed mono and dinonyl phenyl) phosphites; phosphite esters of lauryl and stearyl alcohol; di-stearyl-pentaerythritoldiphosphite; bis(2,4-di-tert-butyl-phenyl) pentaerythritol diphosphite; and tri-2,4-di-tert-butyl phenyl phosphite ester.

The preferred primary or hindered phenolic anti-oxidant stabilizers which are employed in the compositions of the present invention are 2,6ditertiary-butyl-para-cresol, or butylated hydroxy toluene (BHT); octadecyl-3-(3,5-di-tert-butyl-4-hydroxy phenyl) propionate (Irganox 1076); tetra-kis[methylene 3-(3',5'-di-tert-butyl-4'-hydroxyphenyl)propionate]methane (Irganox 1010); 2,2' ethylidene bis (4,6-di-tert-butylphenol) (Isonox 129); or 1,3,5-tris(4-tert-butyl-3-hydroxy-2,6-dimethyl benzyl)-1,3,5-triazine-2,4,6-(1H,3H,5H)-trione (Cyanox 1790). The preferred secondary stabilizers include dilauryl thiodipropionate (DLTDP); distearyl thiodipropionate (DSTDP); tri(mixed mono and dinonyl phenyl)phosphite (Polygard); di-stearyl-pentaerythritoldiphosphite (Weston 618); tri(2,4-di-tert-butylphenyl)-phosphite (Mark 2112); bis(2,4-di-tert-butylphenyl)pentaerythritol disphosphite (Weston XP-1532); or tri(-nonylphenol)phosphite (Weston 399, TNPP).

The hindered phenolic anti-oxidants may be used individually or in various combinations with one another or the secondary stabilizers in the compositions of the present invention.

INORGANIC ANTI-BLOCK COMPOUNDS

The extrudable compositions of the present invention contain a finely divided, inorganic material for use as an anti-block or release agent. It has been found that certain finely divided inorganic compounds of a substantially neutral pH do not promote discoloration between the hindered phenoloic anti-oxidants and the polyalkylene glycol or oxide or polyalkoxylated compounds used to control gel streaking and pinstriping.

The anti-block compounds are present in quantities that effect anti-block/release properties. Such amounts are about 0.02 to about 5%, and preferably about 0.08 to about 1% by weight, based on the weight of the film forming composition. The pH of the inorganic anti-block is between about 6 and about 8, preferably as close to a neutral pH of 7 as possible. The average particle size of the anti-block compounds of this invention are from about 0.5 to about 10 microns, preferably from about 2 to about 7 microns in diameter. The average surface area of the inorganic anti-block compounds of this invention are from about 1 to about 500 m²/g.

Suitable anti-block compounds according to the present invention are finely divided diatomaceous earth fluxed with sodium phosphate (White Floss); finely divided diatomaceous earth fluxed with sodium carbonate (Super Floss) which has been neutralized with an acid wash such as dilute phosphoric acid; finely divided calcium carbonate; synthesized and naturally occurring amorphous finely divided silica (Syloid 72, 385, 266 and Imsil A-15); talcs; and the like.

MASTERBATCH CONCENTRATE

As previously described herein, the hindered phenolic anti-oxidant, inorganic anti-block compound and anti-gel compound of this invention may be admixed with a transition metal catalyzed olefin polymer containing halide residues such as the well known Ziegler-Natta catalyzed polymers via a masterbatch concentrate to yield the extrudable film forming composition of this invention. The Ziegler-Natta catalyzed olefin polymer typically is admixed with the masterbatch concentrate in a letdown ratio of between about 5 and about 100 to 1 by weight. Preferably, a letdown ratio of between about 5 and about 30 to 1 by weight is employed.

The master batch concentrate is comprised of between about 40% and about 98% by weight, preferably between about 60% and about 95% by weight, of an olefin polymer compatible with the Ziegler-Natta catalyzed olefin polymer with which the masterbatch concentrate is admixed. Compatibility of the olefin polymers can be judged by the general quality of the extruded film product in terms of the increased presence of haze, gel-like defects or gross distortions of the surface texture, commonly referred to as an "applesauce" or "sharkskin-like" surface.

The masterbatch concentrate further includes between about 0.1% and about 5% by weight of a hindered phenolic anti-oxidant; between about 0.1% and about 5% by weight of the anti-gel compound of this invention; and between about 2% and about 48%, by weight, preferably between about 3% and about 20% by weight, of an inorganic anti-block compound of this invention having a substantially neutral pH.

EXTRUDABLE COMPOSITIONS

The extrudable compositions of the present invention may be used in any of the forms of such compositions which are commonly employed in the extruded film arts, such as compounds modified with various slip agents such as fatty acid amides and anti-static additives for specific end use applications.

These extrudable compositions are thermoplastic in nature. In addition to the olefin polymer, anti-gel compound, hindered phenolic anti-oxidant, near neutral pH inorganic, anti-block compound, the compositions of the present invention may contain other adjuvant materials which are commonly employed in olefin polymer-based extrudable film compositions. Such other adjuvants would include plasticizers, fillers, pigments, lubricants, slip agents, modifiers and similar materials.

The fillers which may be used in the olefin polymer-based extrudable compositions of the present invention are the fillers which are commonly used with such polymers. The fillers are used in amounts which correspond to about 1 to 20 percent by weight, based on the weight of the olefin polymer. Such fillers would include materials such as carbon black, titanium dioxide, clays, calcium silicates and others known in the art.

Process lubricants which are commonly employed in the olefin polymer-based extrudable compositions are the lubricants which are commonly used with such polymers. The lubricants are used in amounts which correspond to about 0.02 to 2 percent by weight of lubricant agent based on the weight of the olefin polymer. Examples of such lubricants are ethylene bis stearamide; zinc, calcium and/or magnesium stearates; hydrocarbon waxes; and the like.

EXTRUDING CONDITIONS

The extrudable conditions of the present invention are particularly designed for use in equipment utilized for tubular film, cast film and extrusion coating products. Such equipment may have hold-up areas or areas of stagnation that retard the flow of extrudate therethrough, leads to the development of gel streaking and pinstriping in the presence of hindered phenolic antioxidants and in the absence of the use of the anti-gel additives of the present invention. In such equipment, the olefin polymer based extrudable compositions are subjected to extrusion temperatures of about 135° C. to about 340° C., and preferably about 190° C. to about 340° C., under varying conditions of heat and pressure, and for periods of time of about 0.5 to 10 minutes.

The film is usually prepared in sheets which are about 2.5 to 250 μM thick.

According to the present invention, the olefin polymer compositions are not exposed to post-reactor high temperature compounding or finishing which could introduce hydroperoxides into the composition prior to film extrusion. Instead the three aforementioned additives are admixed via a masterbatch concentrate or by directly dry blending the anti-gel and anti-oxidant compounds into the granular olefin polymer with the anti-block compound separately admixed prior to extrusion of the composition. Another advantage of this invention is that gas treatment (e.g., with propylene oxide) after polymerization of the olefin polymer is not required nor are subsequent alcohol washes required to remove the propylene oxide or ethylene oxide gas products nor the subsequent drying process to remove the alcohol. Also unnecessary is the need for devolatilization of alcohols or water which could be added to neutralize and break down catalyst residue.

The following examples are illustrative of the present invention and are not intended as a limitation of the scope thereof.

EXAMPLE 1

Preparation of Polymer Resins

Two low pressure, low density ethylene-butene-1 copolymers were prepared according to the procedure disclosed in South African Patent Publication No. 79-01365, published Sept. 22, 1980, entitled "Process For Making Film From Low Density Ethylene Hydrocarbon Copolymer" by W. A. Fraser et al. The properties of the ethylene-1 butene-1 copolymer were determined by the following methods:

Density was determined according to ASTM D-1501. A plaque was conditioned for one hour at 100° C. to approach equilibrium crystallinity. Density is reported as gms/cm$^3$.

Melt Index (MI) was determined according to ASTM D-1238, Condition E. It was measured at 190° C. and 303 kPa and reported as grams/10 minutes.

Flow Index (HLMI) was measured according to ASTM D-1238, Condition F. It was measured at 10 times the weight used in the melt index test above and reported as grams per 10 minutes.

Melt Flow Ratio (MFR) was calculated as Flow Index/Melt Index.

Ti, Mg, Al and Si catalyst residues in the ethylene-butene-1 copolymer in ppm was measured by induction coupled plasma emission spectroscopy.

Cl catalyst residue in the ethylene-butene-1 copolymer in ppm was measured by a Dohrmann micro-coulometric titration system.

One of the ethylene-butene-1 copolymers, designated A, had the following properties: a melt index of 1.0; a MFR of 28; a density of 0.918 gm/cm$^3$; and a catalyst residue in ppm of Ti-2, Mg-2, Al-73, Si-56 and Cl-13.

The other ethylene-butene-1 copolymer, designated B, had the following properties: a melt index of 2.0; a MFR of 28; a density of 0.918 gm/cm$^3$; and a catalyst residue in ppm of Ti-3, Mg-4, Al-89, Si-97 and Cl-16.

Either polymer A or B was used in the polymer compositions of all the subsequent examples herein.

Preparation of Polymer Compositions

One of two methods to prepare polymer compositions was employed in the examples. In one method, the components were dry blended in a roll drum for 20 minutes at room temperature with a virgin olefin polymer. In the other method, the components were compounded into masterbatch concentrates utilizing a Banbury batch mixer coupled to a Farrel Birmingham single screw extruder melt pump. The components were mixed in the Banbury mixer for 4 to 5 minutes, dropped at 125° C., and extruded through an extruder melt pump using a throat temperature of 104° C., a barrel temperature of 150° C. and a die temperature of 150° C. Each masterbatch concentrate was admixed with a high pressure, low density ethylene polymer having a melt index of 2.0 and a density of 0.918 gm/cm$^3$ (commercially available under the trade name DFD 4140 from Union Carbide Corporation, Old Ridgebury Road, Danbury, Conn. 06810). This high pressure, low density polyethylene is designated as Polymer C in Table I. Ten masterbatch concentrates were prepared and their compositions are set forth in Table I below:

TABLE I

| Masterbatch Concentrate No. | Composition | Concentration (Weight %) |
|---|---|---|
| 1 | Polymer C | 87.0 |
|   | Octadecyl 3-(3',5'-di-tert-butyl-4'-hydroxyphenyl) propionate | 0.4 |
|   | Polyethylene glycol (molecular weight of 4000) | 1.0 |
|   | Finely divided diatomaceous earth fluxed with sodium carbonate, having an average particular size of about 6 μm and a pH of about 10 | 10.0 |
|   | Erucamide | 1.6 |
| 2 | Polymer C | 87.0 |
|   | Octadecyl 3-(3',5'-di-tert-butyl-4'-hydroxyphenyl) propionate | 0.4 |
|   | Polyethylene glycol (molecular weight of 4000) | 1.0 |
|   | Synthetic amorphous finely divided silica having a particle size of about 4 μm and a pH of about 6.5 | 10.0 |
|   | Erucamide | 1.6 |
| 3 | Polymer C | 86.6 |
|   | Octadecyl 3-(3',5'-di-tert-butyl-4'-hydroxyphenyl) propionate | 0.4 |
|   | Di-stearyl-pentaerythritol-diphosphite | 0.4 |

TABLE I-continued

| Masterbatch Concentrate No. | Composition | Concentration (Weight %) |
|---|---|---|
| | Polyethylene glycol (molecular weight of 4000) | 1.0 |
| | Finely divided diatomaceous earth fluxed with sodium carbonate, having an average particule size of about 6 μm and a pH of about 10 | 10.0 |
| | Erucamide | 1.6 |
| 4 | Polymer C | 87.0 |
| | Octadecyl 3(3',5'-di-tert-butyl-4'-hydroxyphenyl)propionate | 0.4 |
| | Polyethylene glycol (molecular weight of 4000) | 1.0 |
| | Finely divided diatomaceous earth fluxed with sodium phosphate, having an average particle size of about 5 μm and a pH of about 7 | 10.0 |
| | Erucamide | 1.6 |
| 5 | Polymer C | 87.0 |
| | Octadecyl 3-(3',5'-di-tert-butyl-4'-hydroxyphenyl)propionate | 0.4 |
| | Polyethylene glycol (molecular weight of 4000) | 1.0 |
| | Finely divided calcium carbonate having an average particle size of about 3.2 μm, and having a pH of about 8 | 10.00 |
| | Erucamide | 1.6 |
| 6 | Polymer C | 82.77 |
| | Tetra-kis[methylene 3-3',5'-di-tert-butyl-4'-hydroxyphenyl)propionate]methane | 0.4 |
| | Polyethylene oxide having a molecular weight of 600,000 | 1.0 |
| | Finely divided diatomaceous earth fluxed with sodium carbonate, having an average particular size of about 6 μm and a pH of about 10 | 13.33 |
| | Erucamide | 2.5 |
| 7 | Polymer C | 81.97 |
| | Tetra-kis[methylene 3-3',5'-di-tert-butyl-4'-hydroxyphenyl)propionate]methane | 0.4 |
| | Tri-nonyl-phenyl phosphite ester | 0.8 |
| | Polyethylene oxide having a molecular weight of 600,000 | 1.0 |
| | Finely divided diatomaceous earth fluxed with sodium carbonate, having an average particular size of about 6 μm and a pH of about 10 | 13.33 |
| | Erucamide | 2.5 |
| 8 | Polymer C | 98.6 |
| | Tetra-kis[methylene 3-3',5'-di-tert-butyl-4'-hydroxyphenyl)propionate]methane | 0.4 |
| | Polyethylene oxide having a molecular weight of 600,000 | 1.0 |
| 9 | Polymer C | 84.045 |
| | Octadecyl 3-(3',5'-di-tert-butyl-4'-hydroxyphenyl)propionate | 0.025 |
| | Tri-nonyl-phenyl phosphite ester | 0.1 |
| | Finely divided diatomaceous earth fluxed with sodium carbonate, having an average particle size of about 6 μm and a pH of about 10 | 13.33 |
| | Erucamide | 2.5 |
| 10 | Polymer C | 82.77 |
| | Tetra-kis[methylene 3-3',5'-di-tert-butyl-4'-hydroxyphenyl)propionate]methane | 0.4 |
| | Polyethylene oxide having a molecular weight of 600,000 | 1.0 |
| | Finely divided diatomaceous earth fluxed with sodium phosphate, having an average particle size of about 5 μm and a pH of about 7 | 13.33 |
| | Erucamide | 2.5 |

The measurement of pH of the various anti-block compounds used in 9 of the masterbatch concentrates of table I was done using the following procedure. 20 grams of the inorganic anti-block compound was placed in a 200 ml glass beaker with 100 ml of distilled water. The mixture was magnetically stirred for 30 minutes and then the anti-block compound was allowed to settle from the slurred mixture. The pH of the settled water slurry was measured using litmus paper capable of discerning pH values in the 4 to 12 range.

EXAMPLE 2

A series of 22 control experiments or runs were conducted to illustrate disadvantages associated with the use of olefin polymer based film extrusion formulations which did not contain one or more of the following: the anti-gel compound or near neutral (6–8) pH anti-block compound of this invention or a hindered phenolic anti-oxidant. Films extruded from the 22 control formulations exhibited blocking or gel streaking/pinstriping or discoloration upon aging in the extruded film or a combination thereof. The 22 control formulations were prepared by one of the methods described hereinabove.

After the control formulations were prepared, films were extruded in a tubular extrusion device for various periods of time to assess gel formation/pinstriping. The extruded films were aged at 60° C. for 4 weeks to assess discoloration. For runs 1, 3 and 6–15, the following extrusion conditions were employed: Film was extruded at 3 lbs/hr with a 385° F. melt temperature using a 1-inch Killion 24 to 1 length to diameter extruder equipped with a 1¼ inch die with a 0.030 inch gap. No nitrogen purge was used on the extrusion hopper. For runs 2 and 16–22, the following extrusion conditions were employed: Film was extruded on a 2½ inch diameter 24 to 1 length to diameter Egan extruder equipped with a 6-inch diameter Sano die having a 0.100 inch die gap. The extrusion rate was about 85 lbs/hr with a melt temperature of about 390° F.

The extruded films were approximately 1.5 mils thick. During extrusion, the films wre examined periodically for gel streak formation and pinstriping. After aging for 4 weeks at 60° C., the films also were examined for discoloration. Table II hereinbelow sets forth the resin control compositions employed and the results obtained with respect to gel streak formation/pinstriping/discoloration. The number symbols used to designate the visual appearance of the film with respect to gel streaking/pinstriping/discoloration have the following meanings:

0—clear of gel streaking/pinstriping/discoloration
1—slight gel streaking/pinstriping/discoloration
2—moderate gel streaking/pinstriping/discoloration
3—severe gel streaking/pinstriping/discoloration As can be seen from a review of the information disclosed in Table II, runs 1 and 2 were made with additive-free polymer control compositions, which exhibited slight gel streaking/pinstriping and did not discolor upon aging at 60° C. for 4 weeks. The additive-free polymer control compositions of runs 1 and 2 do not have long term storage stability or reprocessing stability and lack adequate handling characteristics such as anti-block or non-tack properties.

Runs 3–5 were made with hindered phenolics antioxidant stabilized polymer control formulations which exhibited severe gel streaking/pinstriping, but not discoloration in the extruded film upon aging at 60° C. for 4 weeks.

Runs 6–15 were made with polymer control formulations containing a hindered phenolic anti-oxidant, various anti-gel compounds, e.g., polyethylene glycols/oxides or an ethoxylated linear alcohol. These polymer control compositions exhibited no gel streaking/pinstriping and slightly discolored upon aging at 60° C. for 4 weeks. The control formulations for runs 6–15 lack adequate handling characteristics such as anti-block or non-tack properties.

Runs 16–22 were made with polymer control formulations containing a hindered phenolic anti-oxidant, various anti-gel compounds, e.g., polyethylene glycol or polyethylene oxide, and an inorganic anti-block compound having a pH of about 11. These polymer control formulations did not exhibit gel streaking/pinstriping but became highly discolored after aging 4 weeks at 60° C.

Induced blocking of the films (sample conditioned for 24 hours at 60° C. under a 1.0 kPa load) produced with the control formulations used in runs 1–22 was measured. For runs 1–15, which did not contain an anti-block compound, induced blocking values were found to be greater than 200 grams force to separate two film layers. For runs 16–22, which contained between about 2500 and 10,655 ppm anti-block compound, induced blocking values were found to be less than about 50 grams force to separate two film layers. Induced blocking values below about 50 grams force to separate two film layers were commercially acceptable.

TABLE II

| Run No. | Formulation | Additive Concentration (%) | Gel Streaking Rating | Pinstriping Rating | Discoloration Rating |
|---|---|---|---|---|---|
| 1 | Polymer A | 0 | 1 | 0 | 0 |
| 2 | Polymer B | 0 | 1 0 | 0 | |
| 3 | Polymer A  Octadecyl 3-(3',5'-di-tert-butyl-4'-hydroxyphenyl) propionate | 0.02 | 3 | 3 | 0 |
| 4 | Polymer B  Octadecyl 3-(3',5'-di-tert-butyl-4'-hydroxyphenyl) propionate | 0.02 | 3 | 3 | 0 |
| 5 | Polymer B  Tetra-kis[methylene 3-(3',5'-di-tert-butyl-4'-hydroxyphenyl) propionate]methane | 0.02 | 3 | 3 | 0 |
| 6 | Polymer A  Tetra-kis[methylene 3-(3',5'-di-tert-butyl-4'-hydroxyphenyl) propionate]methane;  Polyethylene glycol (molecular weight of 200) | 0.02  0.05 | 0 | 0 | 0 |
| 7 | Polymer A  Tetra-kis[methylene 3-(3',5'-di-tert-butyl-4'-hydroxypnenyl) propionate]methane;  Polyethylene glycol (molecular weight of 4000) | 0.02  0.05 | 0 | 0 | 0 |
| 8 | Polymer A  Tetra-kis[methylene 3-(3',5'-di-tert-butyl-4'-hydroxyphenyl) propionate]methane;  Polyethylene oxide (molecular weight of 10,000) | 0.02  0.05 | 0 | 0 | 1 |
| 9 | Polymer A  Tetra-kis[methylene 3-(3',5'-di-tert-butyl-4'-hydroxyphenyl) propionate]methane;  Polyethylene oxide (molecular weight of 100,000) | 0.02  0.05 | 0 | 0 | 1 |
| 10 | Polymer A  Tetra-kis[methylene 3-(3',5'-di-tert-butyl-4'-hydroxyphenyl) propionate]methane;  Polyethylene oxide (molecular weight of 600,000) | 0.02  0.05 | 0 | 0 | 1 |
| 11 | Polymer A  Tetra-kis[methylene 3-(3',5'-di-tert-butyl-4'-hydroxyphenyl) propionate]methane;  Polyethylene oxide (molecular weight of 4,000,000) | 0.02  0.05 | 1 | 0 | 1 |
| 12 | Polymer A  Tetra-kis[methylene 3-(3',5'-di-tert-butyl-4'-hydroxyphenyl) propionate]methane; | .02 | | | |

TABLE II-continued

| Run No. | Formulation | Additive Concentration (%) | Gel Streaking Rating | Pinstriping Rating | Discoloration Rating |
|---|---|---|---|---|---|
| | Reaction product of nonyl phenol with 14 moles ethylene oxide | .05 | 0 | 0 | 1 |
| 13 | Polymer A Tetra-kis[methylene 3-(3',5'-di-tert-butyl-4'-hydroxyphenyl) propionate]methane; | 0.02 | 0 | 0 | 1 |
| | Reaction product of nonyl phenol with 40 moles ethylene oxide | 0.05 | | | |
| 14 | Polymer A Tetra-kis[methylene 3-(3',5'-d-tert-butyl-4'-hydroxyphenyl) propionate]methane; | 0.02 | 0 | 0 | 1 |
| | Reaction product of lauryl alcohol with 40 moles ethylene oxide | 0.05 | | | |
| 15 | Polymer A Tetra-kis[methylene 3-(3',5'-di-tert-butyl-4'-hydroxyphenyl) propionate]methane; | 0.02 | 1 | 2 | 1 |
| | Reaction product of lauryl alcohol with 8 moles ethylene oxide | 0.05 | | | |
| 16 | Polymer B Masterbatch Concentrate No. 1 | 5.0 | 0 | 0 | 3 |
| 17 | Polymer B Masterbatch Concentrate No. 3 | 5.0 | 0 | 0 | 3 |
| 18 | Polymer B Masterbatch Concentrate No. 1 | 2.5 | 0 | 0 | 2 |
| 19 | Polymer A Masterbatch Concentrate No. 6 | 8.0 | 0 | 0 | 3 |
| 20 | Polymer A Masterbatch Concentrate No. 6 | 5.0 | 0 | 0 | 3 |
| 21 | Polymer A Masterbatch Concentrate No. 7 | 5.0 | 0 | 0 | 3 |
| 22 | Polymer A Masterbatch Concentrate No. 8 Masterbatch Concentrate No. 9 | 2.5 2.5 | 0 | 0 | 3 |

EXAMPLE 3

Example 2 was repeated using a polymer formulation according to the present invention. A series of 5 experiments (runs 23–27) were conducted to demonstrate the effectiveness of the use of the anti-gel and anti-block compounds of this invention in olefin polymer based film extrusion formulations. Films extruded from the 5 formulations were essentially free from the formation of gel steaks/pinstriping/discoloration in the extruded film upon aging. The formulations were prepared by one of the methods described hereinabove. After the formulations were prepared, films were extruded under the same extrusion conditions described hereinabove for runs 2 and 16–22.

Table III hereinbelow sets forth the polymer formulations employed and the results obtained with respect to gel streak formation/pinstriping/discoloration.

As can be seen from a review of the information disclosed in Table III, runs 23 and 26 were made with polymer B and masterbatch concentrates 2, 4 or 5. Films extruded from these formulations were essentially free from gel streaking, pinstriping and discloration upon aging.

Run 27 was made with polymer A and masterbatch concentrate 10. Film extruded from this formulation was essentially free from gel streaking, pinstriping and discoloration upon aging.

Induced blocking of the films produced with the formulations used in runs 23–27 was measured as previously described herein. For runs 23–27, which contained between 2500 and 6700 ppm near neutral pH anti-block compound of this invention, induced blocking values were found to be less than about 50 grams force to separate two film layers.

TABLE III

| Run No. | Formulation | Additive Concentration (%) | Gel Streaking Rating | Pinstriping Rating | Discoloration Rating |
|---|---|---|---|---|---|
| 23 | Polymer B Masterbatch Concentrate No. 2 | 5.0 | 0 | 0 | 1 |
| 24 | Polymer B Masterbatch Concentrate No. 4 | 5.0 | 0 | 0 | 0 |
| 25 | Polymer B Masterbatch Concentrate No. 5 | 5.0 | 0 | 0 | 0 |
| 26 | Polymer B Masterbatch Concentrate No. 4 | 2.5 | 0 | 0 | 0 |
| 27 | Polymer A Masterbatch Concentrate No. 10 | 5.0 | 0 | 0 | 0 |

What is claimed is:

1. In an improved film-forming composition containing:
   (a) a transition metal catalyzed olefin polymer containing halide residues;
   (b) an anti-gel compound characterized by having at least about 5 repeat units of an alkylene oxide;
   (c) a hindered phenolic anti-oxidant; and
   (d) an inorganic anti-block agent;
   the improvement comprising avoiding a yellowing problem by employing an anti-block agent having a pH of between 6 and 8.

2. In the improved film-forming composition of claim 1 wherein said polymer comprises a Ziegler-Natta catalyzed olefin polymer containing a chloride residue.

3. In the improved film-forming composition of claim 2 wherein said polymer is an ethylene polymer.

4. An extrudable film forming composition which when extruded forms a film which is essentially devoid of gel streaking and pinstriping and which does not discolor upon aging at 60° C. for 4 weeks, said film forming composition being comprised of a Ziegler-Natta catalyzed olefin polymer containing a chloride catalyst residue in a concentration between about 5 and about 500 ppm, at least one hindered phenolic anti-oxidant, at least one inorganic anti-block compound and at least one anti-gel compound, said hindered phenolic anti-oxidant being present in a concentration between about 20 and about 5000 ppm, said inorganic anti-block compound being present in a concentration between about 500 ppm and about 5.0% by weight and having a substantially neutral pH of between 6 and 8, said anti-gel compound characterized by having at least about 5 repeat units of an alkylene oxide and being present in a concentration sufficient to neutralize said chloride catalyst residue, said concentration of said anti-gel compound being at least about 0.8 times the concentration of said hindered phenolic anti-oxidant, said anti-gel compound having a molecular weight between about 200 and about 4,000,000 Daltons.

5. A composition as defined in claim 4 wherein said anti-gel compound is represented by the following structural formula:
   R—(A—R$_1$), wherein
   n is 1 or 2
   R is a hydrogen atom; a hydroxyl group; a $C_1$–$C_{24}$ alkoxy group; a $C_1$–$C_{12}$ alkylated phenoxy group; a $C_{12}$–$C_{24}$ alkyl or alkylene substituted amino or amido group;
   R$_1$ is a hydrogen atom or lower alkyl; A is (R$_2$O)$_x$ or

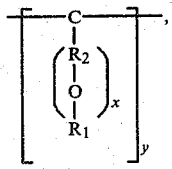

wherein
   R$_2$ is ethylene, propylene or mixtures thereof;
   x is a number between about 5 and about 20,000;
   y is a number between about 2 and about 6; and
   R$_1$ is as defined herein.

6. A composition as defined in claim 4 wherein the anti-gel compound comprises:
   a polyalkylene glycol having a molecular weight between about 200 and about 20,000 Daltons or a polyalkylene oxide having a molecular weight between about 20,000 and about 4,000,000 Daltons.

7. A composition as defined in claim 4 wherein the anti-gel compound comprises:
   the reaction product of either an alkanol or an alkyl phenol with more than about 5 moles of an alkylene oxide.

8. A composition as defined in claim 6 wherein said anti-gel compound comprises said polyalkylene glycol.

9. A composition as defined in claim 8 wherein said polyalkylene glycol is polyethylene glycol.

10. A composition as defined in claim 6 wherein said anti-gel compound comprises said polyalkylene oxide.

11. A composition as defined in claim 10 wherein said polyalkylene oxide is polyethylene oxide, polypropylene oxide or an interpolymer thereof.

12. A composition as defined in claim 7 wherein the anti-gel compound comprises the reaction product of an alkanol with more than about 5 moles of an alkylene oxide.

13. A composition as defined in claim 12 wherein said anti-gel compound is an ethylene or propylene oxide adduct of a lauryl alcohol, mystearyl alcohol, behenyl alcohol, oleyl alcohol or erucyl alcohol, or an adduct of mixtures of said oxides and said alcohols.

14. A composition as defined in claim 7 wherein said anti-gel compound comprises the reaction product of an alkyl phenol with more than about 5 moles of an alkylene oxide.

15. A composition as defined in claim 14 wherein said alkyl phenol is methyl, ethyl, propyl, butyl, pentyl, hexyl, heptyl, octyl, nonyl, decyl, undecyl, or dodecyl phenol or mixtures thereof, and said alkylene oxide is ethylene oxide, propylene oxide or mixtures thereof.

16. A composition as defined in claim 4 wherein said anti-gel compound comprises the reaction product of a $C_{12}$–$C_{24}$ alkyl amine or amide with more than about 5 moles of an alkylene oxide.

17. A composition as defined in claim 16 wherein said alkyl amine or amide is lauryl, mystearyl, palmytyl, stearyl, arachidyl or behenyl amine or amide, respectively, and said alkylene oxide is ethylene oxide, propylene oxide or mixtures thereof.

18. A composition as defined in claim 4 wherein said anti-gel compound comprises the reaction product of a $C_{12}$–$C_{24}$ alkylene amine or amide with more than about 5 moles of an alkylene oxide.

19. A composition as defined in claim 18 wherein said alkylene amine or amide is oleyl or erucyl amine or amide, respectively, or mixtures thereof, and said alkylene oxide is ethylene oxide, propylene oxide or mixtures thereof.

20. A composition as defined in claim 4 wherein said anti-gel compound comprises the reaction product of a polyol or a monoalkyl substituted polyol with more than about 5 moles of an alkylene oxide.

21. A composition as defined in claim 20 wherein said polyol is glycerol, mannitol or sorbitol and said alkylene oxide is ethylene oxide, propylene oxide or mixtures thereof.

22. A composition as defined in claims 6, 7, 12, 14, 16, 18 or 20 wherein said inorganic anti-block compound comprises finely divided diatomaceous earth fluxed with sodium phosphate; finely divided diatomaceous earth fluxed with sodium carbonate which has been neutralized with an acid wash; finely divided calcium carbonate; synthesized or naturally occurring amorphous finely divided silica; or a talc.

23. A composition as defined in claims 9, 11, 13, 15, 17, 19 or 21 wherein said inorganic anti-block compound comprises finely divided diatomaceous earth fluxed with sodium phosphate; finely divided diatomaceous earth fluxed with sodium carbonate which has been neutralized with an acid wash; finely divided calcium carbonate; synthesized or naturally occurring amorphous finely divided silica; or a talc.

24. A composition as defined in claim 4 wherein the pH of said anti-block compound is between about 6 and about 8.

25. A composition as defined in claim 4 wherein said anti-gel compound is characterized by having at least about 10 repeat units of an alkylene oxide.

26. A composition as defined in claim 4 wherein said olefin polymer is an ethylene polymer, said chloride catalyst residue concentration is between about 5 and about 50 ppm, and the concentration of said anti-gel compound is between about 25 and 10,000 ppm.

27. A composition as defined in claim 4 wherein said olefin polymer is a propylene polymer or a butene polymer, said chloride catalyst residue concentration is between about 10 and about 500 ppm, said hindered phenolic anti-oxidant concentration is between about 200 and about 5000 ppm, and the concentration of said anti-gel compound is between about 200 and about 10,000 ppm.

28. A composition as defined in claim 5 wherein said anti-gel compound is present in an amount at least 5 times the amount of chloride catalyst residue present.

29. A composition as defined in claim 28 wherein said anti-gel compound to chloride catalyst residue ratio is greater than 10 to 1.

30. A composition as defined in claim 4 wherein said olefin polymer is an ethylene copolymer selected from the group consisting of ethylene/propylene copolymer, ethylene/butene-1 copolymer, ethylene/pentene-1 copolymer, ethylene/4-methyl-pentene-1 copolymer, ethylene/hexene-1 copolymer, and ethylene/octene-1 copolymer.

31. A composition as defined in claim 4 wherein said olefin polymer is an ethylene interpolymer which includes two or more of the following monomers: propylene, butene-1, pentene-1, hexene-1, 4-methyl-pentene-1 and octene-1.

32. A composition as defined in claim 4 wherein said olefin polymer is a propylene interpolymer which includes two or more of the following monomers: ethylene, butene-1, pentene-1, hexene-1, 4-methyl-pentene-1 and octene-1.

33. A composition as defined in claim 4 wherein said olefin polymer is a butene-1 interpolymer which includes two or more of the following monomers: ethylene, propylene, pentene-1, hexene-1, 4-methyl-pentene-1 and octene-1.

34. A composition as defined in claim 4 further including an organic slip agent.

35. A composition as defined in claim 34 wherein said organic slip agent is erucamide or oleamide.

36. In an improved masterbatch concentrate which, when admixed with a transition metal catalyzed olefin polymer containing halide residues in a let-down ratio of between about 5 and about 100 to 1 by weight of said catalyzed olefin polymer to said masterbatch concentrate, provides a film forming composition capable of being extruded into a film which is essentially free from gel streaking and pinstriping and which does not discolor upon aging at 60° C. for 4 weeks, said masterbatch concentrate comprising:
(a) between about 40% and about 98% by weight of an olefin polymer compatible with said transition metal catalyzed olefin polymer containing halide residues;
(b) between about 0.1% and about 5% by weight of a hindered phenolic anti-oxidant;
(c) between about 0.1% and about 5% by weight of an anti-gel compound having at least about 5 repeat units of an alkylene oxide and also having a molecular weight between about 200 and about 4,000,000 Daltons; and
(d) between about 2% and 48% by weight of an inorganic anti-block agent the improvement comprising avoiding a yellowing problem by employing an anti-blocking agent having a pH of between 6 and 8.

37. In the improved master batch concentrate of claim 36 wherein said polymer comprises a Ziegler-Natta catalyzed olefin polymer containing a chloride residue.

38. In the improved masterbatch concentrate of claim 37 wherein said polymer is an ethylene polymer.

39. A masterbatch concentrate which, when admixed with a Ziegler-Natta catalyzed olefin polymer in a let-down ration of between about 5 and about 100 to 1 by weight of said catalyzed olefin polymer to said masterbatch concentrate, provides a film forming composition capable of being extruded into a film which is essentially free from gel streaking and pinstriping and which does not discolor upon aging at 60° C. for 4 weeks, said masterbatch concentrate comprised of:
between about 40% and about 98% by weight of an olefin polymer compatible with said Ziegler-Natta catalyzed olefin polymer;
between about 0.1% and about 5% by weight of a hindered phenolic anti-oxidant;
between about 0.1% and about 5% by weight of an anti-gel compound having at least about 5 repeat units of an alkylene oxide and also having a molecular weight between about 200 and about 4,000,000 Daltons; and
between about 2% and about 48% by weight of an inorganic anti-block compound having a substantially neutral pH of between 6 and 8.

40. A concentrate as defined in claim 39 wherein the concentrate of said olefin polymer is between about 60% and about 95% by weight and the concentration of said inorganic anti-block compound is between about 4% and about 20% by weight.

41. A concentrate as defined in claim 39 wherein said anti-gel compound is represented by the following structural formula:

R—(A—R$_1$), wherein n is 1 or 2

R is a hydrogen atom; a hydroxyl group; a C$_1$–C$_{24}$ alkoxy group; a C$_1$–C$_{12}$ alkylated phenoxy group; a C$_{12}$–C$_{24}$ alkyl or alkylene substituted amino or amido group;

R$_1$ is a hydrogen atom or lower alkyl;

A is (R$_2$O)$_x$ or

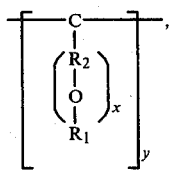

wherein
$R_2$ is ethylene, propylene or mixtures thereof;
x is a number between about 5 and about 20,000;
y is a number between about 2 and about 6; and
$R_1$ is as defined herein.

42. A concentrate as defined in claim 40 wherein the anti-gel compound comprises:
a polyalkylene glycol having a molecular weight between about 200 and about 20,000 Daltons or a polyalkylene oxide having a molecular weight between about 20,000 and about 4,000,000 Daltons.

43. A concentrate as defined in claim 40 wherein the anti-gel compound comprises:
the reaction product of either an alkanol or an alkyl phenol with more than about 5 moles of an alkylene oxide.

44. A concentrate as defined in claim 42 wherein said anti-gel compound comprises said polyalkylene glycol.

45. A concentrate as defined in claim 44 wherein said polyalkylene glycol is polyethylene glycol.

46. A concentrate as defined in claim 42 wherein said anti-gel compound comprises said polyalkylene oxide.

47. A concentrate as defined in claim 46 wherein said polyalkylene oxide is polyethylene oxide, polypropylene oxide or an interpolymer thereof.

48. A concentrate as defined in claim 43 wherein the anti-gel compound comprises the reaction product of an alkanol with more than about 5 moles of an alkylene oxide.

49. A concentrate as defined in claim 48 wherein said anti-gel compound is an ethylene or propylene oxide adduct of a lauryl alcohol, mystearyl alcohol, behenyl alcohol, oleyl alcohol or erucyl alcohol, or an adduct of mixtures of said oxides and said alcohols.

50. A concentrate as defined in claim 43 wherein said anti-gel compound comprises the reaction product of an alkyl phenol with more than about 5 moles of an alkylene oxide.

51. A concentrate as defined in claim 50 wherein said alkyl phenol is methyl, ethyl, propyl, butyl, pentyl, hexyl, heptyl, octyl, nonyl, decyl, undecyl, or dodecyl phenol or mixtures thereof, and said alkylene oxide is ethylene oxide, propylene oxide or mixtures thereof.

52. A concentrate as defined in claim 40 wherein said anti-gel compound comprises the reaction product of a $C_{12}$–$C_{24}$ alkyl amine or amide with more than about 5 moles of an alkylene oxide.

53. A concentrate as defined in claim 52 wherein said alkyl amine or amide is lauryl, mystearyl, palmytyl, stearyl, arachidyl or behenyl amine or amide, respectively, and said alkylene oxide is ethylene oxide, propylene oxide or mixtures thereof.

54. A concentrate as defined in claim 40 wherein said anti-gel compound comprises the reaction product of a $C_{12}$–$C_{24}$ alkylene amine or amide with more than about 5 moles of an alkylene oxide.

55. A concentrate as defined in claim 54 wherein said alkylene amine or amide is oleyl or erucyl amine or amide, respectively, or mixtures thereof, and said alkylene oxide is ethylene oxide, propylene oxide or mixtures thereof.

56. A concentrate as defined in claim 40 wherein said anti-gel compound comprises the reaction product of a polyol or a monoalkyl substituted polyol with more than about 5 moles of an alkylene oxide.

57. A concentrate as defined in claim 56 wherein said polyol is glycerol, mannitol or sorbitol and said alkylene oxide is ethylene oxide, propylene oxide or mixtures thereof.

58. A concentrate as defined in claims 42, 43, 48, 50, 52, 54 or 56 wherein said inorganic anti-block compound comprises finely divided diatomaceous earth fluxed with sodium phosphate; finely divided diatomaceous earth fluxed with sodium carbonate which has been neutralized with an acid wash; finely divided calcium carbonate; synthesized or naturally occurring amorphous finely divided silica; or a talc.

59. A concentrate as defined in claims 45, 47, 49, 51, 53, 55 or 57 wherein said inorganic anti-block compound comprises finely divided diatomaceous earth fluxed with sodium phosphate; finely divided diatomaceous earth fluxed with sodium carbonate which has been neutralized with an acid wash; finely divided calcium carbonate; synthesized or naturally occurring amorphous finely divided silica; or a talc.

60. A concentrate as defined in claim 40 wherein the pH of said anti-block compound is between about 6 and about 8.

61. A concentrate as defined in claim 40 further including an organic slip agent.

62. A concentrate as defined in claim 61 wherein said organic slip agent is erucamide or oleamide.

* * * * *

UNITED STATES PATENT AND TRADEMARK OFFICE
CERTIFICATE OF CORRECTION

PATENT NO. : 4,412,025
DATED : October 25, 1983
INVENTOR(S) : M.A. Corwin, G.N. Foster It is certified that error appears in the above—identified patent and that said Letters Patent is hereby corrected as shown below:

In Table II, Run. No. 2 under "Gel Streaking Rating" delete "10" and substitute -- 1 --.

In Table II, Run. No. 2 under "Discoloration Rating" insert -- 0 --.

Signed and Sealed this

Seventh Day of August 1984

[SEAL]

Attest:

GERALD J. MOSSINGHOFF

Attesting Officer  Commissioner of Patents and Trademarks